(12) United States Patent
Kobayashi et al.

(10) Patent No.: US 11,884,208 B2
(45) Date of Patent: Jan. 30, 2024

(54) DANGER DETECTION SYSTEM, METHOD AND PROGRAM, AND DANGER LOCATION DETECTION APPARATUS

(71) Applicant: NIPPON TELEGRAPH AND TELEPHONE CORPORATION, Tokyo (JP)

(72) Inventors: Kazunori Kobayashi, Tokyo (JP); Hiroaki Ito, Tokyo (JP); Shin Murata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 224 days.

(21) Appl. No.: 17/621,727

(22) PCT Filed: Jun. 26, 2019

(86) PCT No.: PCT/JP2019/025375
§ 371 (c)(1),
(2) Date: Dec. 22, 2021

(87) PCT Pub. No.: WO2020/261427
PCT Pub. Date: Dec. 30, 2020

(65) Prior Publication Data
US 2022/0250540 A1    Aug. 11, 2022

(51) Int. Cl.
*B60W 50/14* (2020.01)
*B60Q 5/00* (2006.01)
*G08G 1/16* (2006.01)

(52) U.S. Cl.
CPC ............. *B60Q 5/006* (2013.01); *B60W 50/14* (2013.01); *G08G 1/16* (2013.01)

(58) Field of Classification Search
CPC ............. B60W 50/14; B60W 2555/20; B60W 2555/00; B60T 2210/00; B60T 2210/30; B60T 2210/32
See application file for complete search history.

(56) References Cited

U.S. PATENT DOCUMENTS

2019/0202467 A1*   7/2019  Sun .................. B60W 50/14

FOREIGN PATENT DOCUMENTS

| JP | 2010111372 A | 5/2010 |
|---|---|---|
| JP | 2016-076085 A | 5/2016 |

OTHER PUBLICATIONS

"Road Traffic Information Now!!" [online], [retrieved on Jun. 5, 2019], Japan Road Traffic Information Center, Internet <URL: http://www.jartic.or.jp/> with its translation generated by machine.

* cited by examiner

*Primary Examiner* — Benyam Haile

(57) ABSTRACT

A danger detection system for detecting a danger on a road, the danger that changes over time and may not be a danger due to the change over time, the danger detection system including a vibration acquisition unit 11 configured to acquire an acoustic signal collected by a microphone mounted on a vehicle when the vehicle passes through a region on a predetermined road, a danger determination unit 12 configured to determine whether the acoustic signal is derived from the danger, a danger location detection unit 2 configured to determine whether the danger is present in the region on the predetermined road based on the number of times an acoustic signal acquired from each of the plurality of vehicles is determined to be derived from the danger, and a danger information notification unit 3 configured to notify a communication device that can pass through the region on the predetermined road of danger information that is information about a region on a road determined to have a danger.

7 Claims, 9 Drawing Sheets

DANGER DETECTION SYSTEM, METHOD AND PROGRAM, AND DANGER LOCATION DETECTION APPARATUS

CROSS-REFERENCE TO RELATED APPLICATIONS

This application is a U.S. National Stage Application filed under 35 U.S.C. § 371 claiming priority to International Patent Application No. PCT/JP2019/025375, filed on 26 Jun. 2019, the disclosure of which is hereby incorporated herein by reference in its entirety.

TECHNICAL FIELD

The present disclosure relates to a technique for detecting a danger on roads.

BACKGROUND ART

Dangerous sites for traveling automobiles are spotted through visual recognition by the drivers or through display on message signs by road administrators or the like (e.g., see Non Patent Literature 1).

CITATION LIST

Non Patent Literature

Non Patent Literature 1: "Road Traffic Information Now!!" [online], [retrieved on Jun. 5, 2019], Japan Road Traffic Information Center, Internet <URL: http://www.jartic.or.jp/>

SUMMARY OF THE INVENTION

Technical Problem

However, the driver may have difficulty dealing with dangers using visual recognition because some dangers can be perceived only when they are imminent. In addition, all dangers cannot be covered with display on the message signs by road administrators because information that the road administrators can perceive (information of broken vehicles, snow coverage, and the like) is displayed only on a limited number of message signs.

The present disclosure aims to provide a danger detection system, method, and program and a danger location detection device that enable dangers on roads to be detected earlier than in the related art.

Means for Solving the Problem

A danger detection system according to an aspect of the present disclosure is a danger detection system configured to detect a danger on a road, the danger that changes with a time-series change and may become less dangerous due to the time-series change, the danger detection system including a vibration acquisition unit configured to acquire an acoustic signal collected by a microphone mounted on a vehicle when the vehicle passes through a region on a predetermined road, a danger determination unit configured to determine whether the acoustic signal is derived from the danger, a danger location detection unit configured to determine whether the danger is present in the region on the predetermined road based on the number of times an acoustic signal acquired from each of a plurality of the vehicles is determined to be derived from the danger, and a danger information notification unit configured to notify a communication device with a possibility of passing through the region on the predetermined road of danger information that is information regarding a region on a road determined to have the danger.

Effects of the Invention

Dangers on roads can be detected earlier than in the related art.

DESCRIPTION OF EMBODIMENTS

Figure 1:
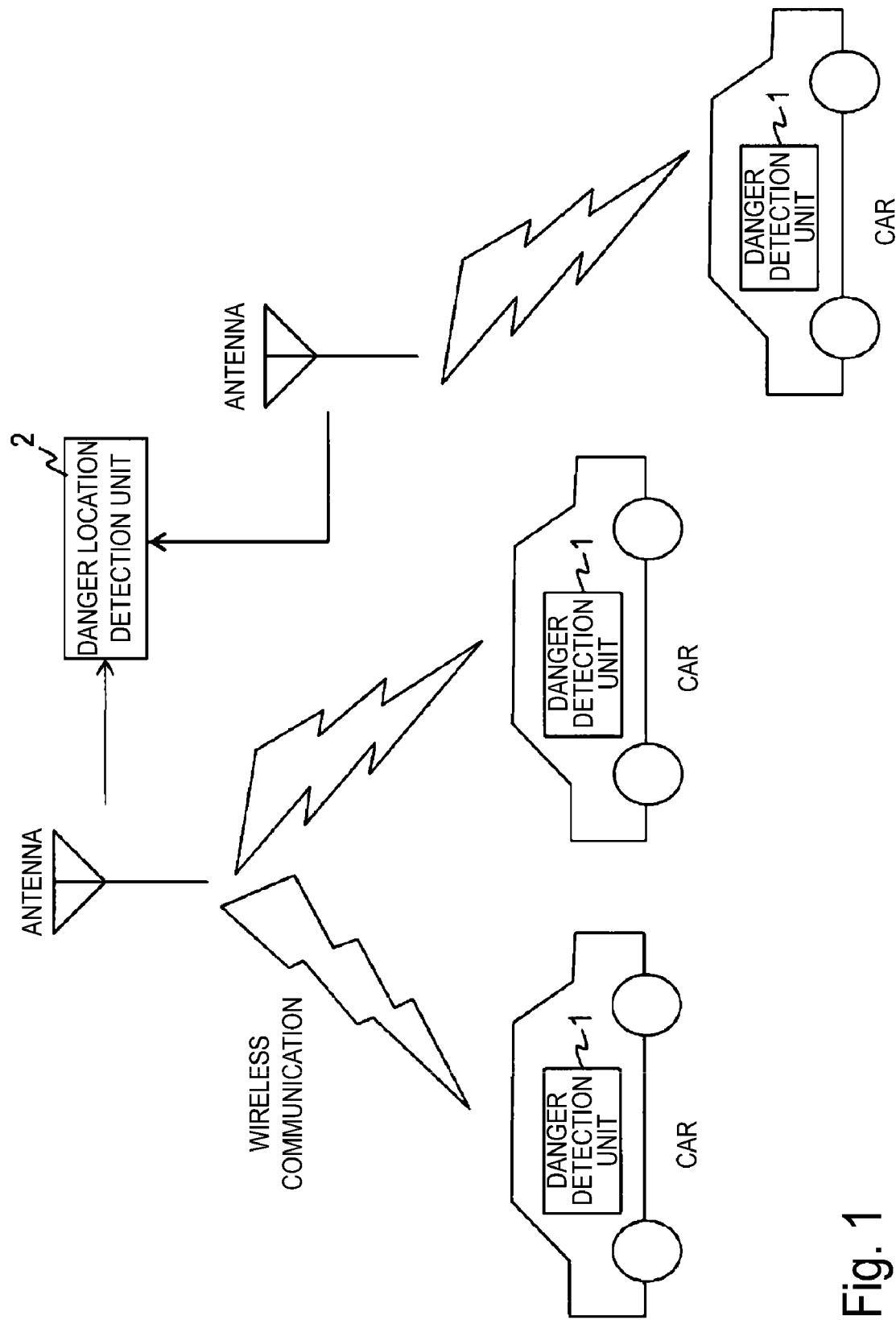
FIG. 1 is a diagram for describing an overview of a danger detection system.

Hereinafter, embodiments of the present disclosure will be described in detail. Further, the same reference numerals are given to constituent units having the same functions in the drawings, and overlapping description will be omitted.

First Embodiment

FIG. 1 is a diagram for describing an overview of a danger detection system.

Currently, there are an increasing number of automobiles connected to mobile communication networks using communication devices carried by the drivers, such as smartphones and the like, and communication units equipped as a standard in automobiles such as cars (also referred to as vehicles). In addition, such communication devices or automobiles may be equipped with sensors of a GPS, an acceleration sensor, a microphone, a video camera, and the like. A danger detection system, device, and method use such sensors to detect dangers on roads. In addition, the danger detection system enables information of the dangers to be transmitted to following automobiles via a wireless network and a server. As a result, the following automobiles can acquire the danger information in advance at a proper timing, and thus can perform safe driving.

Figure 2:
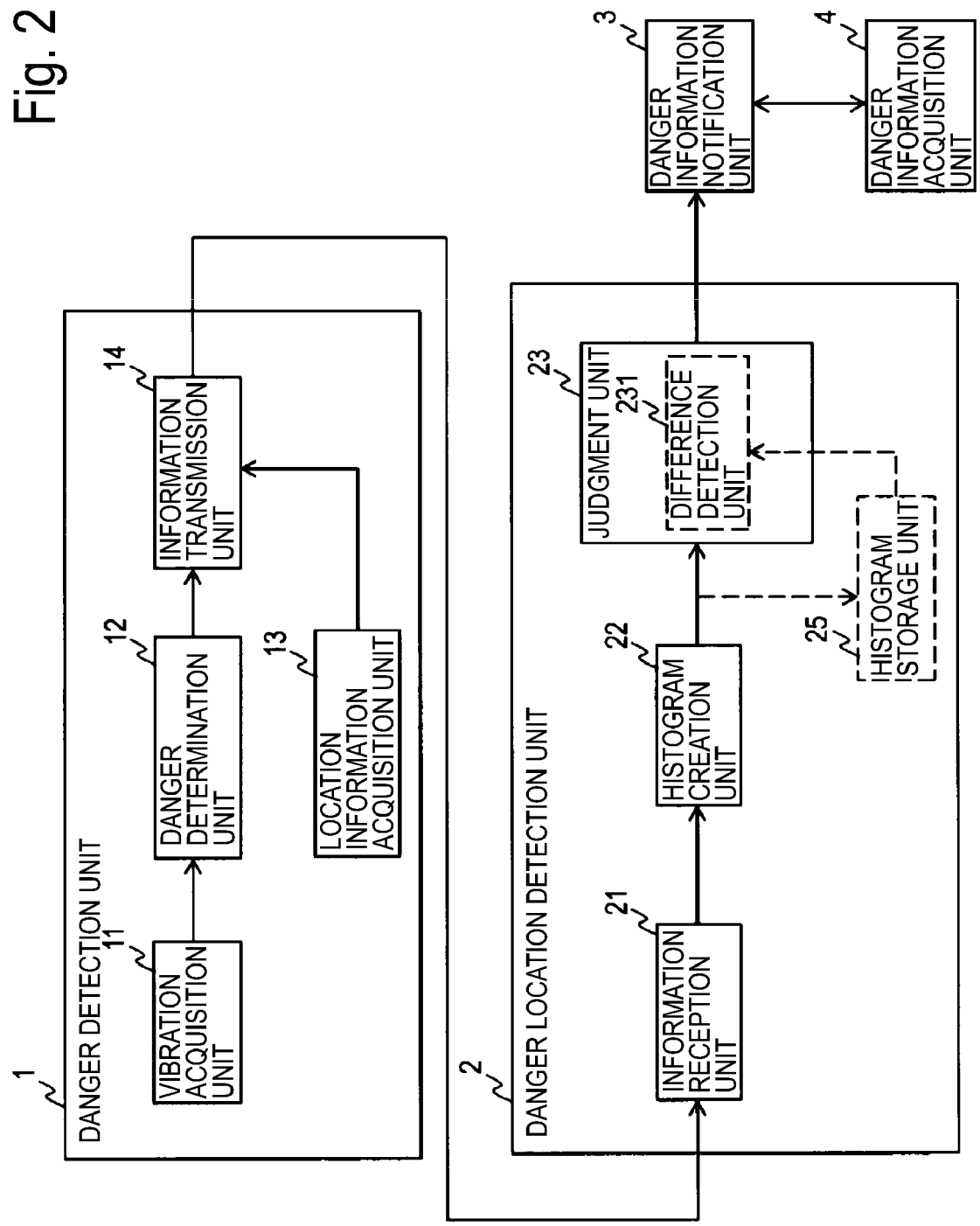
FIG. 2 is a diagram illustrating an example of a functional configuration of an abnormality detection system according to first and third embodiments.

FIG. 2 is a diagram illustrating an example of a functional configuration of the danger detection system according to a first embodiment.

The danger detection system includes a danger detection unit 1, a danger location detection unit 2, a danger information notification unit 3, and a danger information acquisition unit 4.

Figure 3:
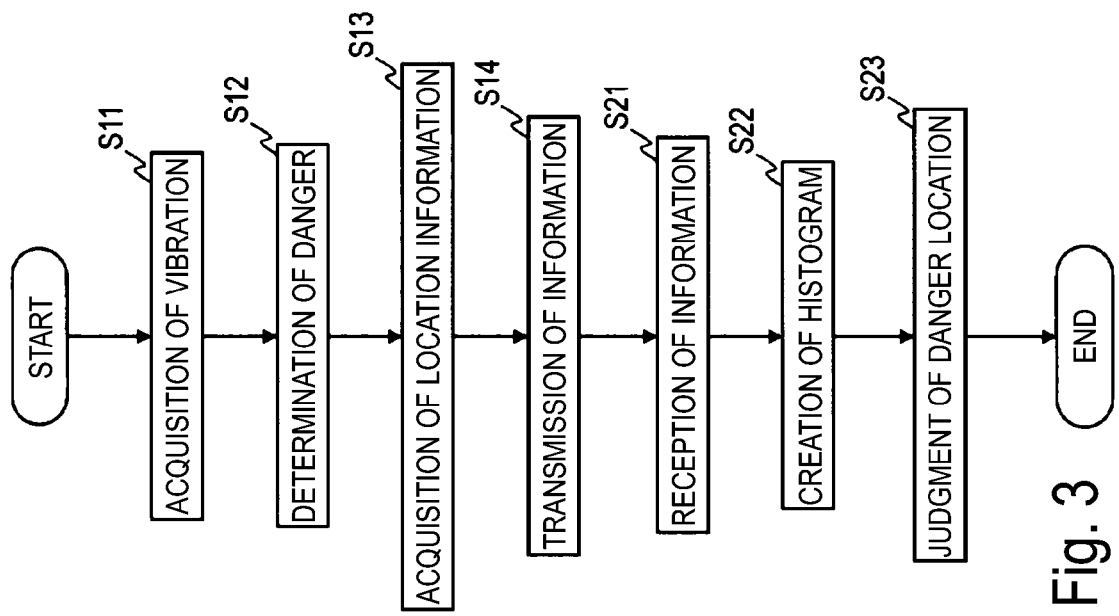
FIG. 3 is a diagram illustrating an example of a processing procedure of a danger detection method.

The danger detection method is implemented by each of the constituent units of a danger detection device, for example, by performing the processes in steps S11 to S23 illustrated in FIG. 3 which will be described below.

Danger Detection Unit 1

The danger detection unit 1 is provided in each of a plurality of vehicles.

The danger detection unit 1 includes, for example, a vibration acquisition unit 11, a danger determination unit 12, a location information acquisition unit 13, and an information transmission unit 14.

Vibration Acquisition Unit 11

The vibration acquisition unit 11 acquires a vibration signal which is a signal of a vibration generated when a vehicle passes a road (step S11). The vibration acquisition unit 11 is a sensor that acquires a vibration signal of a microphone, a vibration sensor, an acceleration sensor, or the like. It is assumed that the vibration signal also includes an acoustic signal, which is a signal of a longitudinal vibration of an elastic body, such as air, acquired by a microphone. Hereinafter, a case in which the vibration signal is an acoustic signal will be described as an example.

The acoustic signal acquired by the vibration acquisition unit 11 is output to the danger determination unit 12.

Danger Determination Unit 12

The acoustic signal acquired by the vibration acquisition unit 11 is input to the danger determination unit 12.

The danger determination unit 12 determines whether the acoustic signal is derived from a danger (step S12).

The determination result is output to the information transmission unit 14. The danger determined by the danger determination unit 12 is a danger on a road that may change over time and may not be a danger due to change over time. Examples of such dangers include puddles, snow coverage, strong winds, holes, and the like.

Example 1

Example 1 of the danger determination unit 12 will be described.

Figure 4:
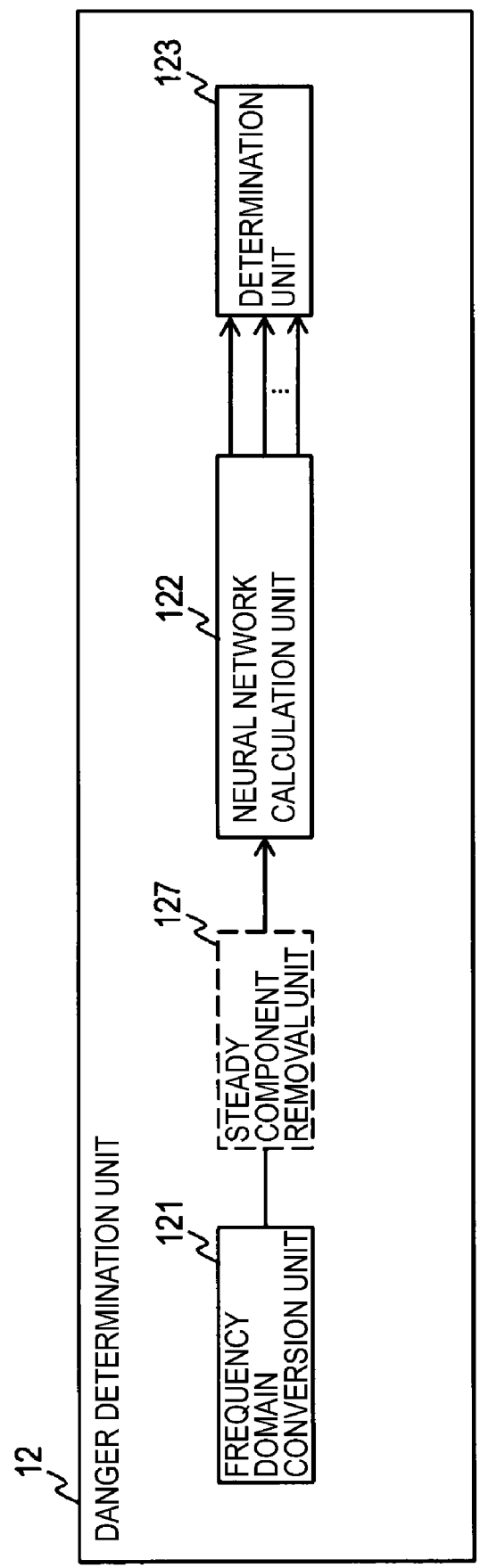
FIG. 4 is a diagram for describing an example of a danger determination unit.

The danger determination unit 12 of Example 1 includes a frequency domain conversion unit 121, a neural network calculation unit 122, and a determination unit 123 as illustrated in FIG. 4.

First, the frequency domain conversion unit 121 converts the acquired vibration signal into a frequency domain signal.

For the conversion to the frequency domain, a method of multiplying a window by a frame size of tens to hundreds of milliseconds and converting the multiplication result into the frequency domain in a Fourier transform, or the like is used. The frequency domain conversion unit 121 may calculate the power after the Fourier transform to convert it into a power spectrum, or may average the frequency on a logarithmic scale to determine the mel spectrum.

Then, the neural network calculation unit 122 collects frequency domain signals for one frame or a plurality of frames, and inputs the frequency domain signals into a neural network that has learned the spectrum of dangerous sites in advance, and determines an estimated value of likelihood for each type of danger. For example, if there are four types of danger such as puddle, snow coverage, strong wind, and hole, an estimated value of likelihood of each of the four types of danger is calculated and output to the determination unit 123.

The determination unit 123 selects the type with maximum likelihood in the output of the neural network, and detects the acoustic signal as a dangerous site derived from a danger if the likelihood of the selected type is greater than a preset threshold value.

Example 2

Example 2 of the danger determination unit 12 will be described.

Figure 5:
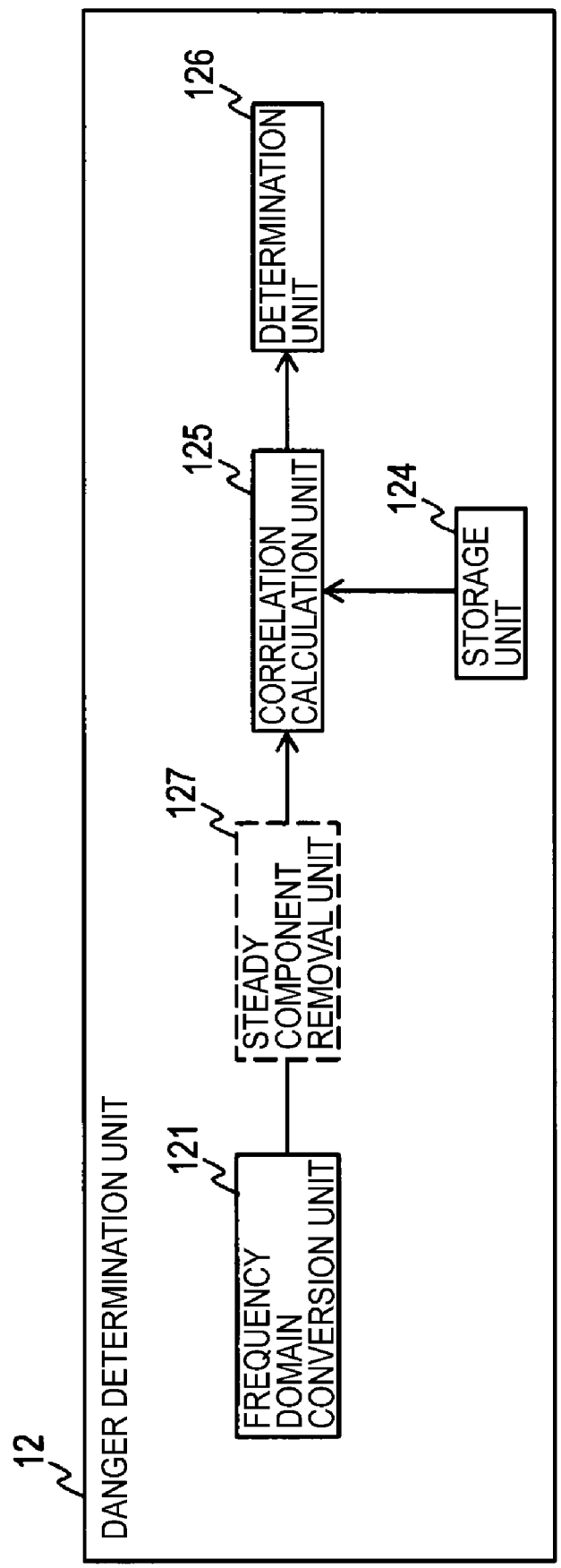
FIG. 5 is a diagram for describing an example of another danger determination unit.

The danger determination unit 12 of Example 2 includes a frequency domain conversion unit 121, a storage unit 124, a correlation calculation unit 125, and a determination unit 126 as illustrated in FIG. 5.

The frequency domain conversion unit 121 is similar to the frequency domain conversion unit 121 of the danger determination unit 12 in Example 1.

The storage unit 124 stores typical examples of frequency spectra generated at dangerous sites prepared in advance.

The correlation calculation unit 125 calculates each correlation between the output of the frequency domain conversion unit 121 and a spectrum stored in the storage unit 124.

The determination unit 126 detects the type with highest correlation, and if the correlation value is greater than a preset threshold value, it is assumed that a danger of the type has been detected.

Further, a steady component removal unit 127 may be provided after the frequency domain conversion unit 121 as indicated by the dashed lines in FIGS. 4 and 5. This unit removes steady traveling sounds and makes it easier to detect a dangerous site. The steady component removal unit 127 is configured to perform processing operations such as averaging the output of the frequency domain conversion unit 121 for a long period of time (such as dozens of seconds) to obtain a steady noise component, and subtracting the steady noise component.

Location Information Acquisition Unit 13

The location information acquisition unit 13 acquires location information of an automobile and outputs the acquired location information to the information transmission unit 14. The location information is, for example, GPS location information.

Information Transmission Unit 14

The information transmission unit 14 receives input of the judgment result from the danger determination unit 12 and the location information of the automobile acquired by the location information acquisition unit 13.

If the danger determination unit 12 determines that the acoustic signal is derived from a danger, the information transmission unit 14 transmits information of the danger (step S14).

Specifically, if the acoustic signal is determined to be derived from a danger based on the input judgment result and the location information, the information transmission unit 14 transmits the location information of the road determined to have the danger and information on the type of danger included in the input judgment result to the danger location detection unit 2.

Danger Location Detection Unit 2

The danger location detection unit 2 includes, for example, an information reception unit 21, a histogram creation unit 22, and a judgment unit 23.

Information Reception Unit 21

The information reception unit 21 receives the information transmitted by the information transmission unit 14 of the danger detection unit 1 (step S21). The danger information is output to the histogram creation unit 22.

The information reception unit 21 receives information transmitted by the information transmission unit 14 of the danger detection unit 1 provided on each of the plurality of vehicles.

Histogram Creation Unit 22

The histogram creation unit 22 creates a histogram by counting the number of times acoustic signals included in the information received by the information reception unit 21 are judged to be derived from dangers for each predetermined location (step S22). The created histogram is output to the judgment unit 23.

Figure 6:
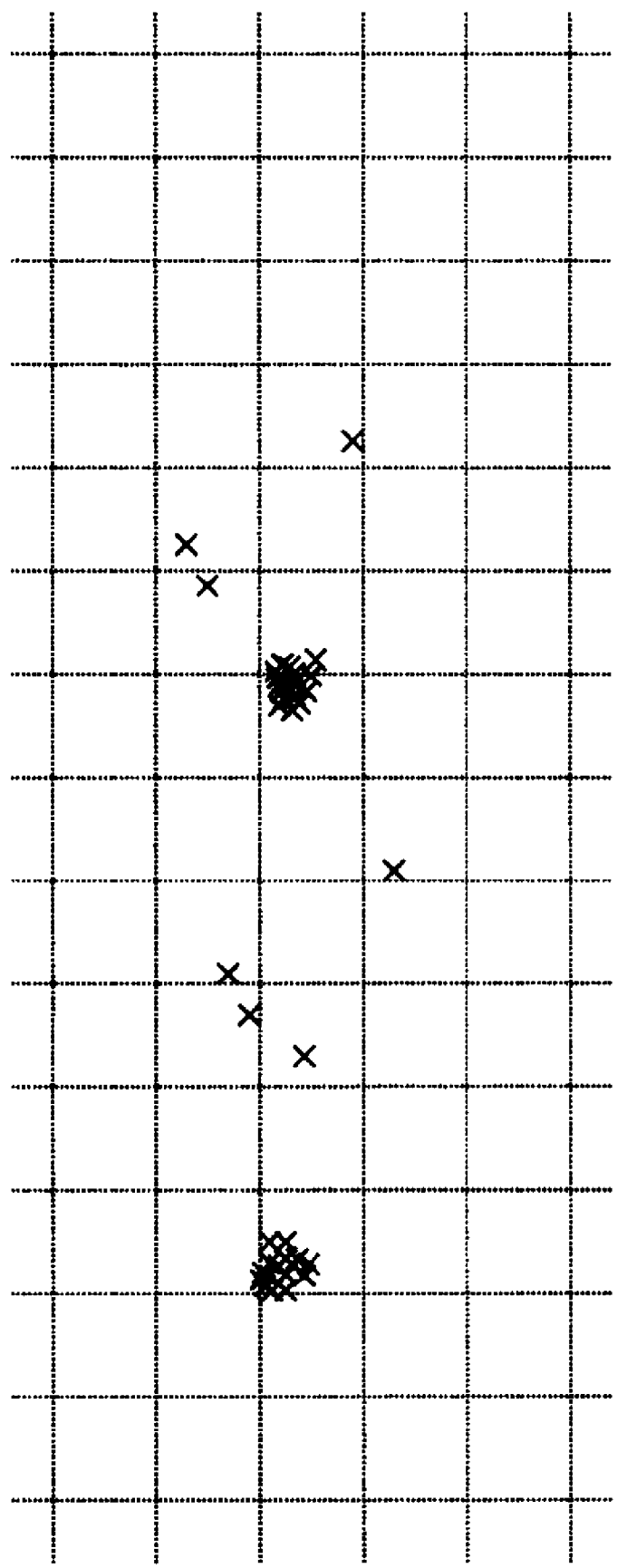
FIG. 6 is a diagram for describing an example of creation of a histogram.

The histograms are aggregated over a period of time, for example, several hours, days, one month, one year, or the like. For example, the number of detections at a location on a map that is divided into meshes as illustrated in FIG. 6 is counted to obtain the number of detections at each mesh. FIG. 6 is a diagram for describing an example of creation of a histogram.

Judgment Unit 23

The judgment unit 23 judges a location of the danger based on the created histogram (step S23). The judgment result from the judgment unit 23 is transmitted to the danger information notification unit 3.

For example, the judgment unit 23 judges a danger when the count value for each location exceeds a preset threshold value.

Further, the judgment unit 23 may transmit, to the danger information notification unit 3, a judgment result that the danger has been cleared if the number of determined dangers is less than the preset threshold value.

In this way, the danger location detection unit 2 determines whether the danger is present in a region on a given road based on a number of times acoustic signals acquired from each of the plurality of vehicles are determined to be derived from dangers (step S2).

Danger Information Notification Unit 3

The danger information notification unit 3 receives input of the judgment result made by the judgment unit 23 of the danger location detection unit 2.

The danger information notification unit 3 stores information on the input judgment result.

Further, when the judgment result that the danger has been cleared is received, the danger information notification unit 3 deletes the information of the location at which the danger has been cleared.

The danger information notification unit 3 notifies a communication device that could pass through the region on the given road of the danger information that is information of the region on the road determined to have a danger based on the information of the stored judgment result (step S3).

Danger Information Acquisition Unit 4

The danger information acquisition unit 4 is provided in each vehicle.

The danger information acquisition unit 4 determines a region on the road on which the vehicle is about to travel from information such as the GPS information of the vehicle, the traveling direction, and the traveling route of the navigation and transmits the information to the danger information notification unit 3.

The danger information notification unit 3 receives the information of the region on the road on which the vehicle is about to travel from the danger information acquisition unit 4. If a danger is present in the region on the road mentioned in the received information, the danger information notification unit 3 transmits the danger information to the danger information acquisition unit 4.

In this way, the danger information acquisition unit 4 receives the danger information of the region on the road on which the vehicle is about to travel (step S4).

The danger information acquisition unit 4 makes a presentation of the type and location of the danger using voice, or presentation of the type and location of the danger on a display to notify the driver of the danger.

Using the above-described method, it is possible to determine a danger on a road from data such as traveling sounds and vibrations gathered from general vehicles, for example. As a result, it is possible to monitor many dangers on roads and detect dangers earlier than in the related art. In addition, it is possible to notify following automobiles of the danger information.

Second Embodiment

For a danger detection system of the second embodiment, some of the functions of the danger determination unit 12 of the danger detection system of the first embodiment are transplanted from an automobile to a danger location detection unit 2 which is a server on a network.

Due to the operation, spectrum data of various automobiles at the time of normal traveling can be stored. As a result, it is possible to grasp the spectrum at each location at normal times and detect that the spectrum is not in a normal state based on whether the spectrum deviates from the normal range. Accurate detection can be expected compared to detecting a danger for each automobile.

Hereinafter, parts that are different from those of the first embodiment will be mainly described. Description of parts similar to those in the first embodiment will be omitted.

Figure 7:
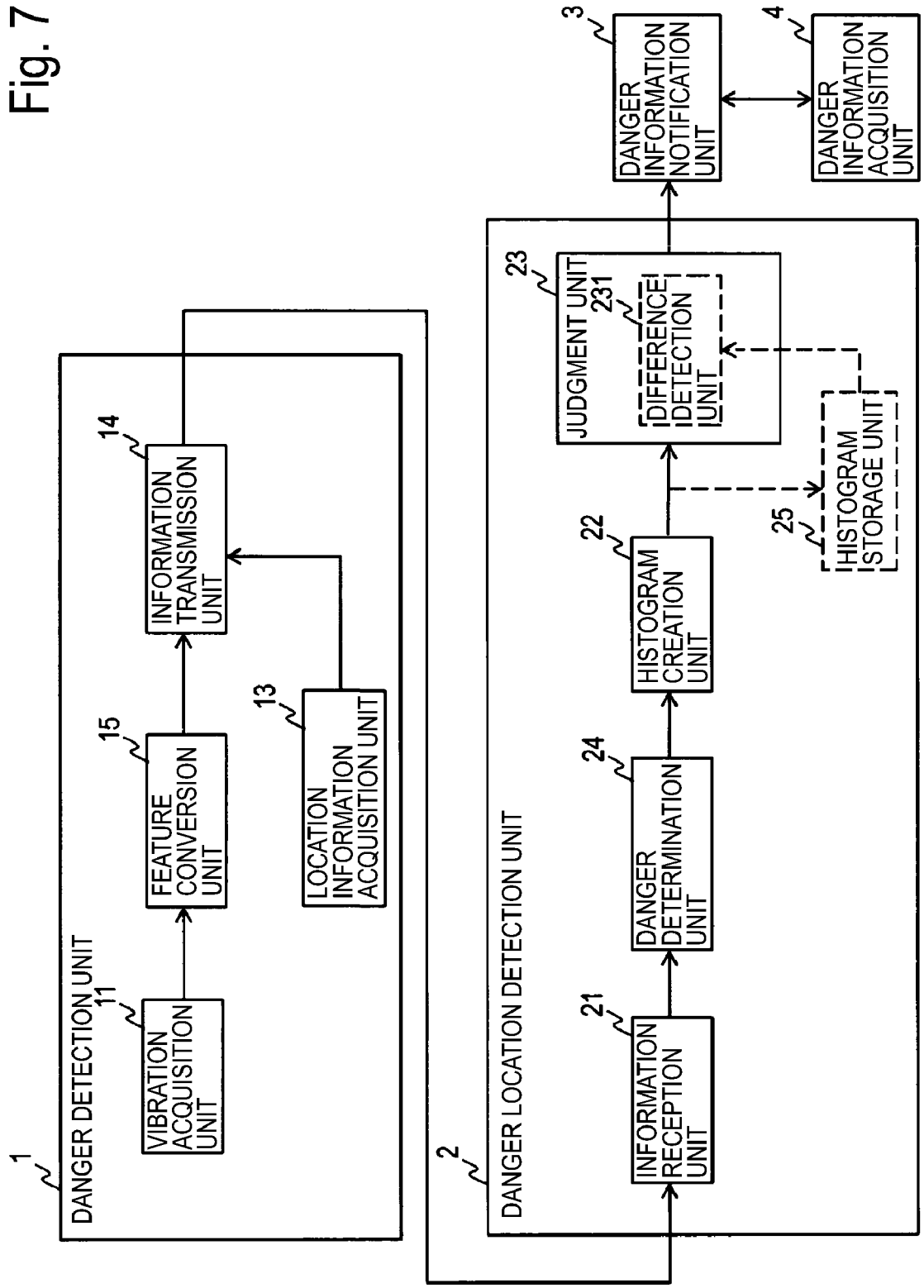
FIG. 7 is a diagram illustrating an example of a functional configuration of an abnormality detection system according to second and third embodiments.

A danger detection unit 1 includes a feature conversion unit 15 as illustrated in FIG. 7.

The feature conversion unit 15 receives input of a vibration signal (e.g., an acoustic signal) acquired by a vibration acquisition unit 11. Hereinafter, a case in which the vibration signal is an acoustic signal will be described as an example.

The feature conversion unit 15 converts the input acoustic signal to a feature such as a frequency spectrum. The feature conversion unit 15 may convert an acoustic signal that has been input in a manner considering privacy in which the original acoustic signal is prohibited from being restored into a feature. For example, the feature conversion unit 15 may set only a spectral envelope as a feature.

The converted feature is output to an information transmission unit 14.

The information transmission unit 14 receives input of the feature converted by the feature conversion unit 15 and location information of an automobile acquired by a location information acquisition unit 13.

The information transmission unit 14 transmits information of the input feature and the location information of the automobile. An information reception unit 21 of a danger location detection unit 2 receives the information.

The danger location detection unit 2 includes a danger determination unit 24 as illustrated in FIG. 7. The information received by the information reception unit 21 is input to the danger determination unit 24.

The danger determination unit 24 determines whether the acoustic signal is derived from a danger and the type of danger from the feature included in the information received by the information reception unit 21.

Figure 8:
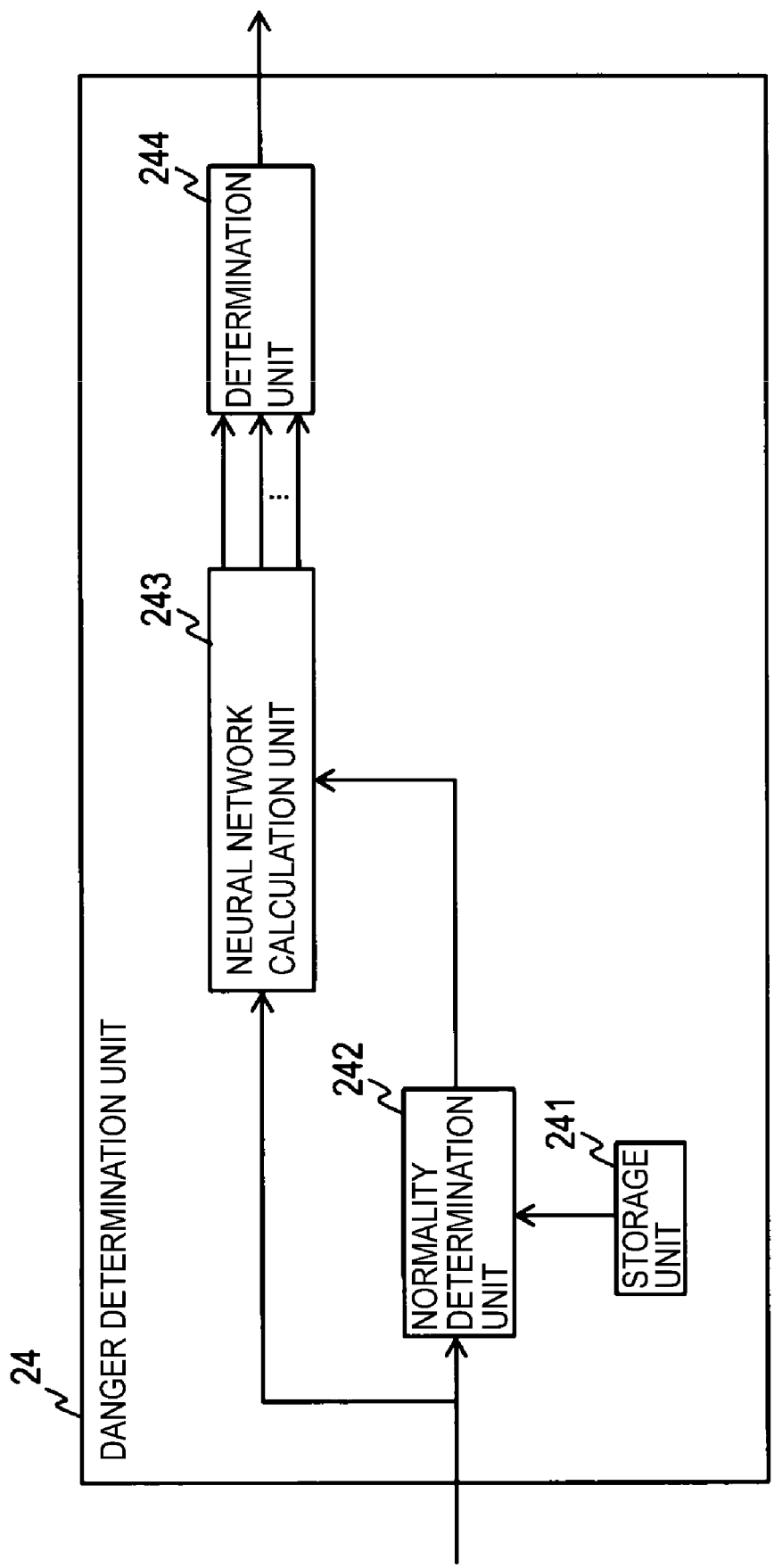
FIG. 8 is a diagram for describing an example of a danger determination unit.

The danger determination unit 24 includes a storage unit 241, a normality determination unit 242, a neural network calculation unit 243, and a determination unit 244 as illustrated in FIG. 8.

The storage unit 241 stores the feature included in the information received by the information reception unit 21 and a typical example of a feature for each location determined by averaging location information for a long period of time.

The normality determination unit 242 selects a feature corresponding to the location information which is close to the location information included in the received information among features stored for each location in the storage unit 241 and performs comparison using a correlation between the selected and received features. If the feature is lower than a preset threshold value, abnormality is determined. The determination result on normality or abnormality is output to the neural network calculation unit 243.

The neural network calculation unit 243 and the determination unit 244 perform the process of danger detection only when abnormality is determined. Processing operations of the neural network calculation unit 243 and the determination unit 244 are similar to those of the neural network calculation unit 122 and the determination unit 123 of the first embodiment.

In this way, by performing the process of danger detection only when abnormality is determined, it is possible to reduce false detections caused by normal traveling sounds or traveling vibrations.

Third Embodiment

A danger detection system of a third embodiment is a system implemented by adding a histogram storage unit 25 and a difference detection unit 231 to the danger detection system of the first or second embodiment as illustrated by the dashed lines in FIGS. 2 and 7.

Hereinafter, parts that are different from those of the first embodiment will be mainly described. Description of parts similar to those in the first embodiment will be omitted.

Histogram Storage Unit 25

A histogram generated by the histogram creation unit 22 is stored in the histogram storage unit 25.

As a result, the histogram storage unit 25 stores histograms created in the past by the histogram creation unit 22. Further, the aggregation periods of the past histograms may be longer than the aggregation period of the histogram created this time by the histogram creation unit 22.

Difference Detection Unit 231

The judgment unit 23 of the third embodiment further includes the difference detection unit 231.

The difference detection unit 231 judges a location at which a danger was present if the acoustic signal was derived from a danger based on a histogram created in the past, the histogram being read from the histogram storage unit 25, and judges that no danger is present for the location at which a danger was present even if it is judged this time that a danger is present at the location based on a histogram created by the histogram creation unit 22.

In this way, the difference detection unit 231 detects a difference between the location determined to have been dangerous based on the past histogram and the location determined to be dangerous based on the current histogram. Then, if the location detected to be dangerous based on the current histogram is detected as dangerous based on the past histogram, the difference detection unit 231 cancels the detection.

As a result, a newly found dangerous location can be detected by excluding detection of a location at which an outbreak is detected even though the location is not dangerous, such as a known dangerous site or a bridge seam.

If a danger is detected in a past histogram, the average value for the same position in the past histogram may be compared with a value in the current histogram, the detected danger may be canceled if the value is less than or equal to a predetermined value, and the danger may be determined if the value is higher than the predetermined value.

In addition, if a site that was identified as being not dangerous in past histograms, such as a bridge seam, occupies a significantly large ratio of histograms than the average of past histograms, it is considered to be an abnormality has occurred in a bridge seam, and thus the bridge seam may be determined to be a dangerous site.

Modification Examples

Although the embodiments of the present disclosure have been described, a specific configuration is not limited to the embodiments, and appropriate changes in the design are, of course, included in the present disclosure within the scope without departing from the gist of the present disclosure.

The various processing operations described in the embodiments are not only executed sequentially in the described order in the time series manner but may also be executed in parallel or separately as necessary or in accordance with a processing capability of the device that performs the processing operations.

For example, data may be directly exchanged between constituent units of the danger detection system or may be exchanged via a storage unit, which is not illustrated.

Program and Recording Medium

Figure 9:
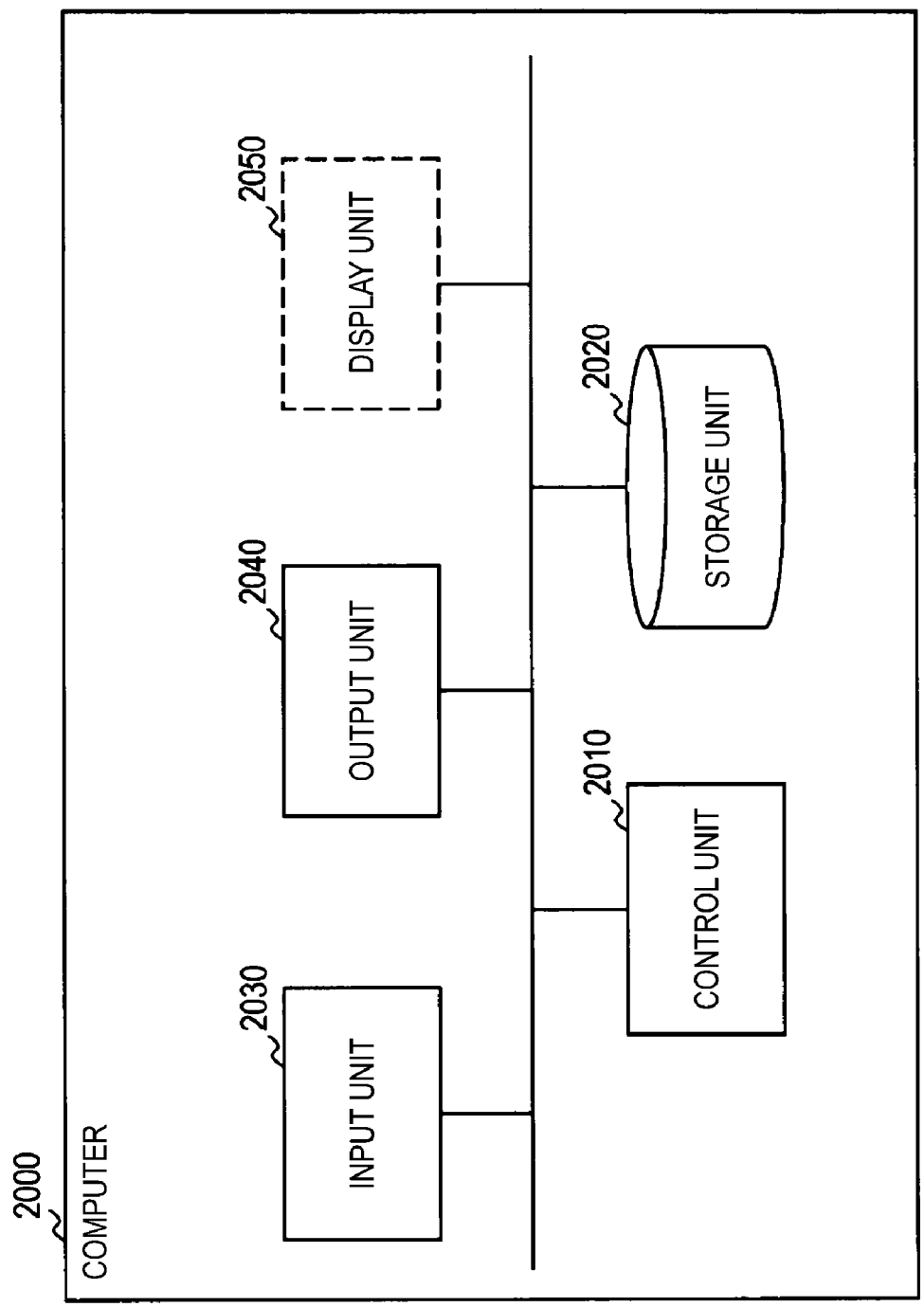
FIG. 9 is a diagram illustrating an example of a functional configuration of a computer.

In a case in which various processing functions of each device described above are implemented by a computer, processing details of the functions that each device should have are described by a program. In addition, when the program is executed by a computer, the various processing functions of each device are implemented on the computer. For example, the above-described various processing operations can be executed by causing a recording unit 2020 of a computer illustrated in FIG. 9 to read a program to be executed and causing a control unit 2010, an input unit 2030, an output unit 2040, and the like to operate the program.

The program in which the processing details are described can be recorded on a computer-readable recording medium. The computer-readable recording medium, for example, may be any type of medium such as a magnetic recording device, an optical disc, a magneto-optical recording medium, or a semiconductor memory.

In addition, the program is distributed, for example, by selling, transferring, or lending a portable recording medium such as a DVD or a CD-ROM in which the program is recorded. Further, the program may be stored in a storage device of a server computer and transmitted from the server computer to another computer via a network so that the program is distributed.

For example, a computer executing the program first temporarily stores the program recorded on the portable recording medium or the program transmitted from the server computer in its own storage device. In addition, when processing is executed, the computer reads the program stored in its own storage device and executes processing in accordance with the read program. Further, as another execution mode of the program, the computer may directly read the program from the portable recording medium and execute processing in accordance with the program, or further, may sequentially execute the processing in accordance with a received program every time a program is transferred from the server computer to the computer. In addition, another configuration for executing the above-described processing may be adopted using a so-called application service provider (ASP) service in which processing functions are implemented only by issuing an instruction to execute the program and obtaining results without transmitting the program from the server computer to the computer. Further, the program in this mode is assumed to include data which is information provided for processing of a computer and is equivalent to a program (data that is not a direct command to the computer but has characteristics of defining processing of the computer or the like).

In addition, although the device is configured by executing a predetermined program on a computer in the present mode, at least a part of the processing details may be implemented by hardware.

The invention claimed is:

1. A danger detection system configured to detect a danger on a road, the danger that changes with a time-series change and may become less dangerous due to the time-series change, the danger detection system comprising:
   a vibration acquisition unit configured to acquire an acoustic signal collected by a microphone mounted on a vehicle when the vehicle passes through a region on a predetermined road;
   a danger determination unit configured to determine whether the acoustic signal is derived from the danger;
   a danger location detection unit configured to determine whether the danger is present in the region on the predetermined road based on the number of times an acoustic signal acquired from each of a plurality of the vehicles is determined to be derived from the danger; and
   a danger information notification unit configured to notify a communication device with a possibility of passing through the region on the predetermined road of danger information that is information regarding a region on a road determined to have the danger.

2. The danger detection system according to claim 1, wherein the danger location detection unit includes (i) an information reception unit configured to receive, from a plurality of vehicles, pieces of location information on a road on which an acoustic signal is determined to be derived from a danger, (ii) a histogram creation unit configured to create, in units of predetermined regions, a histogram by counting the number of locations corresponding to the pieces of location information that are received, and (iii) a determination unit configured to judge a location with a danger based on the histogram that is created.

3. The danger detection system according to claim 2, wherein the danger location detection unit further includes a histogram storage unit configured to store a histogram previously created by the histogram creation unit, and
   the determination unit includes a difference detection unit configured to judge a location at which a danger was present based on a histogram previously created, the histogram being read from the histogram storage unit, and judge that no danger is present for the location at which the danger was present even if it is judged this time that a danger is present at the location based on the histogram that is created.

4. The danger detection system according to claim 1,
wherein the danger location detection unit includes the danger determination unit,
the danger location detection unit includes an information reception unit configured to receive, from a plurality of vehicles, acoustic signals and pieces of location information on a road,
the danger determination unit determines whether each of the acoustic signals that is received is derived from the danger when each of the acoustic signals that is received is determined to be abnormal, and
the danger location detection unit further includes (i) a histogram creation unit configured to create, in units of predetermined regions, a histogram by counting the number of locations corresponding to pieces of location information on a road on which an acoustic signal is determined to be derived from a danger, and (ii) a determination unit configured to judge a location with a danger based on the histogram that is created.

5. A danger location detection device that is the danger location detection unit according to claim 1.

6. A danger detection method for detecting a danger on a road, the danger that changes with a time-series change and may become less dangerous due to the time-series change, the danger detection method comprising:
   acquiring, by a vibration acquisition unit, an acoustic signal collected by a microphone mounted on a vehicle when the vehicle passes through a region on a predetermined road;
   determining, by a danger determination unit, whether the acoustic signal is derived from the danger;
   determining, by a danger location detection unit, whether the danger is present in the region on the predetermined road based on the number of times an acoustic signal acquired from each of a plurality of the vehicles is determined to be derived from the danger; and
   notifying, by a danger information notification unit, a communication device with a possibility of passing through the region on the predetermined road of danger information that is information regarding a region on a road determined to have the danger.

7. A non-transitory computer readable medium that stores a program causing a computer to operate as units of the danger location detection device according to claim 5.

* * * * *